(12) United States Patent
Everitt et al.

(10) Patent No.: US 9,652,815 B2
(45) Date of Patent: May 16, 2017

(54) TEXEL DATA STRUCTURE FOR GRAPHICS PROCESSING UNIT PROGRAMMABLE SHADER AND METHOD OF OPERATION THEREOF

(75) Inventors: Cass W. Everitt, Austin, TX (US); Henry P. Moreton, Woodside, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/609,698

(22) Filed: Sep. 11, 2012

(65) Prior Publication Data

US 2014/0071128 A1    Mar. 13, 2014

(51) Int. Cl.
| | |
|---|---|
| *G06T 1/20* | (2006.01) |
| *G06T 1/60* | (2006.01) |
| *G06T 15/00* | (2011.01) |
| *G06T 15/04* | (2011.01) |
| *G06F 12/1027* | (2016.01) |

(52) U.S. Cl.
CPC ............ *G06T 1/20* (2013.01); *G06F 12/1027* (2013.01); *G06T 1/60* (2013.01); *G06T 15/005* (2013.01); *G06T 15/04* (2013.01)

(58) Field of Classification Search
CPC ... G06F 12/1027; G06T 15/04; G06T 15/005; G06T 1/60
See application file for complete search history.

(56) References Cited

U.S. PATENT DOCUMENTS

| | | | |
|---|---|---|---|
| 5,886,705 A | 3/1999 | Lentz | |
| 5,917,497 A * | 6/1999 | Saunders | ...................... 345/582 |
| 6,002,407 A * | 12/1999 | Fadden | ......................... 345/582 |
| 6,819,324 B2 * | 11/2004 | Emberling | ................... 345/540 |
| 8,174,534 B2 | 5/2012 | Jiao | |
| 8,212,825 B1 | 7/2012 | Everitt et al. | |
| 8,499,305 B2 | 7/2013 | Jiao | |
| 8,872,823 B2 | 10/2014 | Gould et al. | |
| 2003/0169265 A1 | 9/2003 | Emberling | |
| 2003/0169295 A1 | 9/2003 | Becerra, Jr. | |
| 2011/0292065 A1* | 12/2011 | Minkin | ......................... 345/582 |
| 2012/0038657 A1 | 2/2012 | Grossman et al. | |

(Continued)

FOREIGN PATENT DOCUMENTS

| | | |
|---|---|---|
| CN | 102576470 A | 7/2012 |
| TW | 200926050 A | 6/2009 |
| TW | 201216199 A | 4/2012 |

OTHER PUBLICATIONS

Online Encyclopedia "OpenGL.org", article dealing with the term "texture" dated Aug. 17, 2012, 11 pages.

(Continued)

*Primary Examiner* — Robert Craddock (57) ABSTRACT

A graphics processing subsystem and a method of shading are provided. In one embodiment, the subsystem includes: (1) a memory configured to contain a texel data structure according to which multiple primitive texels corresponding to a particular composite texel are contained in a single page of the memory and (2) a graphics processing unit configured to communicate with the memory via a data bus and execute a shader to fetch the multiple primitive texels contained in the single page to create the particular composite texel.

20 Claims, 4 Drawing Sheets

(56) References Cited

U.S. PATENT DOCUMENTS

2012/0147027 A1\* 6/2012 Molnar et al. ............... 345/582
2012/0212488 A1 8/2012 Yu et al.

OTHER PUBLICATIONS

Online Encyclopedia "Wikipedia", article dealing with the term "computer" dated Sep. 9, 2012, 23 pages.
Translation of German Office Action dated Dec. 3, 2014, Applicant: Nvidia Corporation, 4 pages.

\* cited by examiner

FIG. 4

TEXEL DATA STRUCTURE FOR GRAPHICS PROCESSING UNIT PROGRAMMABLE SHADER AND METHOD OF OPERATION THEREOF

TECHNICAL FIELD

This application is directed, in general, to computer graphics and, more specifically, to data structures for graphics processing units (GPUs).

BACKGROUND

Many computer graphic images are created by mathematically modeling the interaction of light with a three dimensional scene from a given viewpoint. This process, called "rendering," generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling implementation of, among other things, complicated lighting and shading algorithms. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

SUMMARY

One aspect provides a graphics processing subsystem. In one embodiment, the subsystem includes: (1) a memory configured to contain a texel data structure according to which multiple primitive texels corresponding to a particular composite texel are contained in a single page of the memory and (2) a graphics processing unit configured to communicate with the memory via a data bus and execute a shader to fetch the multiple primitive texels contained in the single page to generate the particular composite texel.

In another embodiment, the subsystem includes: (1) a memory configured to contain a texel data structure according to which multiple primitive texels corresponding to a particular composite texel are contained in a single page of the memory and (2) a graphics processing unit configured to communicate with the memory via a data bus and including a plurality of streaming multiprocessors, at least one of the streaming multiprocessors configured to execute a shader. In one embodiment, the shader is configured to: (2a) initiate a fetch of the multiple primitive texels, the initiating involving single address translation and (2b) employ the multiple primitive texels to render the particular composite texel.

Another aspect provides a method of shading. In one embodiment, the method includes: (1) initializing a shader to perform a shading operation with respect to a particular composite texel, (2) initiating a fetch of multiple primitive texels, the initiating resulting in an address translation corresponding to a single page containing the multiple primitive texels, (3) fetching the multiple primitive texels from the single page and (4) employing the multiple primitive texels to perform the shading operation.

BRIEF DESCRIPTION

Reference is now made to the following descriptions taken in conjunction with the accompanying drawings, in which.

DETAILED DESCRIPTION

It is realized herein that, in carrying out their shading algorithms, programmable shaders often read, or "fetch," multiple primitive texel elements, or "texels," from a virtual memory space to create one or more composite texels.

However, because a virtual memory space is an abstraction of physical memory space, a process of address translation is required to translate the address of each primitive texel in the virtual memory space to a physical address. The physical address is then employed to fetch the primitive texel from physical memory. Since modern computer systems employ cache memories to operate faster, a page including the address containing the primitive texel is also loaded into cache memory (or simply "cached") to accommodate the possibility that data at nearby addresses can be read from the cache memory.

Unfortunately, address translation is relatively complex and consumptive of processing resources. For this reason, it is advantageous to reduce the amount of address translation required to be undertaken. In this regard, it has been found advantageous to use a translation lookaside buffer (TLB) to store recently translated addresses and thereby provide a mechanism by which address translations contained in the TLB can be re-used. Unfortunately, as the frequency of address translation increases, the likelihood of a "hit" (namely that the TLB contains an entry for the virtual address requiring translation) diminishes, decreasing the TLB's effectiveness.

Further, loading cache memory with pages from main memory is consumptive of bus bandwidth. For this reason, it is advantageous to reduce the amount of cacheing required to be undertaken.

It is realized herein that the conventional data structure for storing primitive texels in which primitive texels are grouped by object almost invariably causes the multiple primitive texels corresponding to a particular composite texel to span multiple pages of memory. Thus, fetching the multiple primitive texels needed to create a particular composite texel often involves not only excessive address translation but also excessive page cacheing.

It is realized herein that, were the primitive texel data structure reformed such that multiple primitive texels pertaining to a particular composite texel be contained in a single memory page, address translations could be reduced, perhaps dramatically. Accordingly, introduced herein are various embodiments of a primitive texel data structure and a method of operating a primitive texel data structure in which multiple primitive texels corresponding to a particular composite texel are contained, or "interleaved," in a single memory page. Accordingly, a single address translation (or TLB hit) allows multiple primitive texels to be retrieved. In certain embodiments, all of the primitive texels corresponding to a particular composite texel are interleaved in a single memory page, allowing the retrieval of all primitive texels pertaining to the particular composite texel to be fetched with a single address translation (or TLB hit).

It is also realized that when multiple primitive texels are interleaved, the fraction of space a particular composite texel occupies in a given page increases as the size of the texel increases. Stated another way, interleaving reduces the number of composite texels a given page can contain. Thus, when a particular page is fetched, it is likely to contain fewer unneeded primitive texels. This is advantageous, because fetching unneeded primitive texels wastes bandwidth and temporary storage (e.g., cache) space. Interleaving is particularly advantageous when creating sparsely textured images or portions thereof (i.e., those having simpler composite texels). In such cases, the primitive texels can be made smaller (their granularity decreased), increasing the number of primitive texels that can be contained in a memory page and further decreasing waste. For example, if a non-interleaved primitive texel has a 256×256 tile size, interleaving it with four other primitive texels allows the tile size to be reduced to 128×128. If a shader only requires one quadrant of the original 256×256 tile to create a particular composite texel, the primitive texel can be represented in one quarter of the original space. Similarly, it is easier to keep track of the primitive texels that have been fetched.

Some embodiments of the primitive texel data structure and method call for the primitive texels to be interleaved within the pages based on powers of two. For example, if primitive texels are interleaved in 4 kB blocks, and the distance, or "stride," between the 4 kB primitive texel blocks is also a power-of-two multiple of 4 kB, constructing an address for each of the primitive texel blocks in a given page involves inserting one or more most-significant bits (MSBs) to the address of the lowest 4 kB primitive texel block. The address of the lowest 4 kB primitive texel block may be appropriately regarded as a base address, and the inserted MSB(s) may be properly regarded as an offset. Thus, for example, inserting a single "0" MSB addresses even strides, and inserting a single "1" MSB addresses odd strides.

Before describing various embodiments of the primitive texel data structure and method, a computing system within which the primitive texel data structure may be embodied or carried out will be described.

Figure 1:
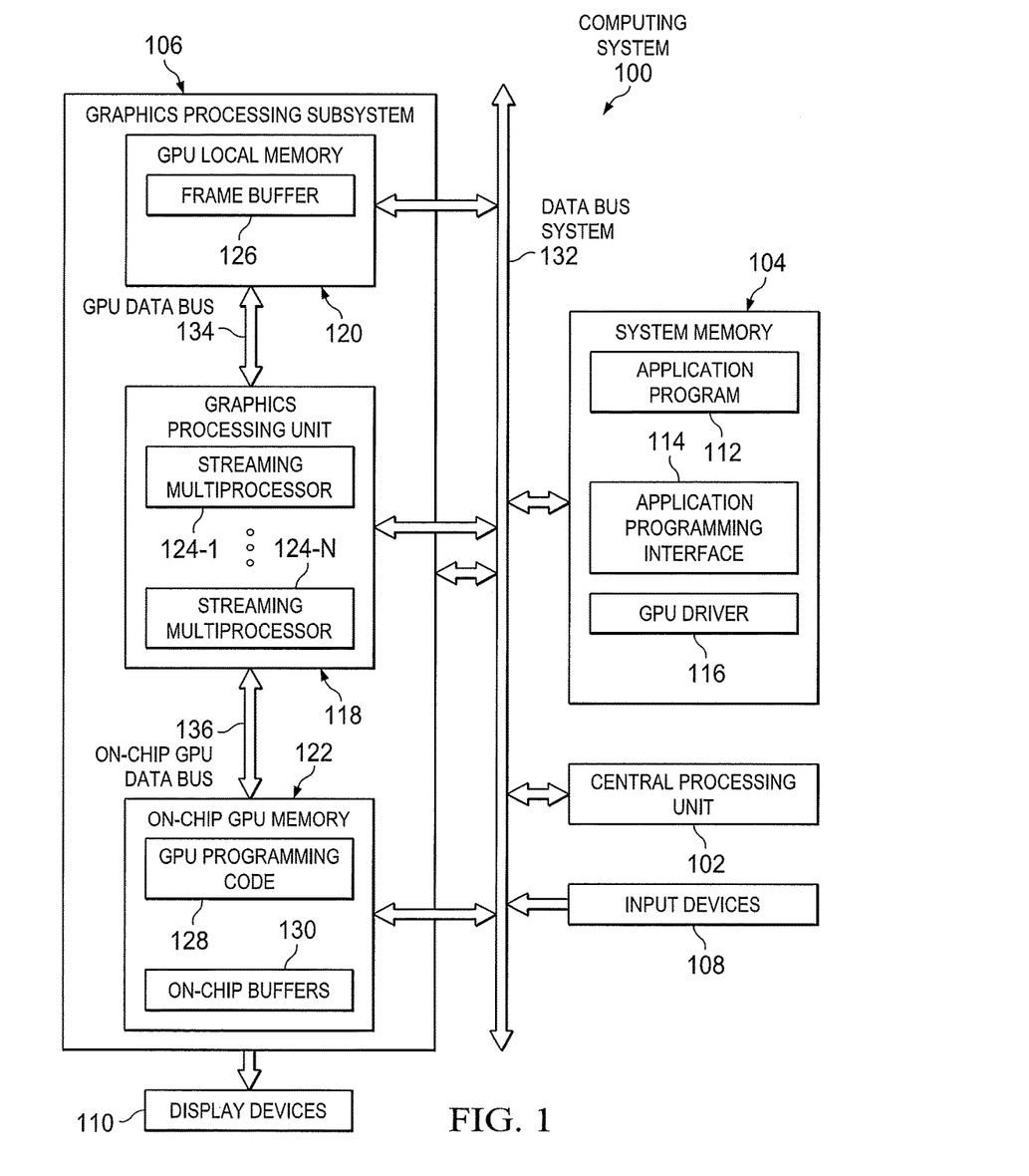
FIG. 1 is a block diagram of one embodiment of a computing system in which one or more aspects of the invention may be implemented.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 110, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) used to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 110 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically used to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also used to store data and programming used by the GPU 118. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 118 can render to one two-dimensional surface while a second two-dimensional surface is used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Figure 2:
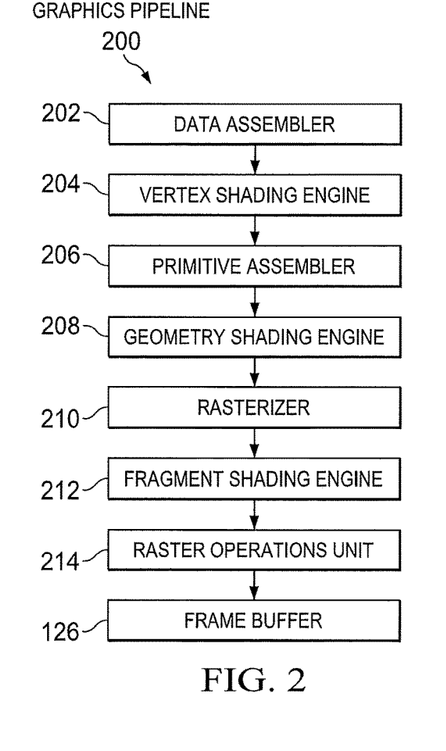
FIG. 2 is a block diagram of one embodiment of a programmable graphics pipeline residing within the GPU of FIG. 1.

FIG. 2 is a block diagram of one embodiment of a programmable graphics pipeline 200 residing within the GPU 100 of FIG. 1. The graphics pipeline 200 is configured to transform 3-D images into 2-D images. As shown, the graphics pipeline 200 includes a data assembler 202, a vertex shading engine 204, a primitive assembler 206, a geometry shading engine 208, a rasterizer 210, a fragment shading engine 212, a raster operations unit 214, and the frame buffer 126 of FIG. 1.

The data assembler 202 is a fixed-function unit that collects vertex data for high-order surfaces, primitives, and the like, and outputs the vertex data to the vertex shading engine 204. The data assembler 202 may gather data from buffers stored within system memory 104, the GPU local memory 120, and the on-chip GPU memory 122 as well as from API calls from the application program 112 used to specify vertex attributes. The vertex shading engine 204 is a programmable execution unit, such as the streaming multiprocessor 124-1, that is configured to execute a machine code vertex shading program, processing vertex data as specified by the vertex shading program. For example, vertex shading engine 204 may be programmed to transform the vertex data from an object-based coordinate representation (object space) to an alternatively based coordinate system, such as world space or normalized device coordinates (NDC) space. The vertex processing unit 204 may read and write data that is stored in GPU local memory 120 and the on-chip GPU memory 122.

The primitive assembler 206 is a fixed-function unit that receives processed vertex data from vertex shading engine 204 and constructs graphics primitives, e.g., points, lines, triangles, or the like, for processing by the geometry shading engine 208. In alternative embodiments, a second primitive assembler (not shown) may be included subsequent to the geometry shading engine 208 in the data flow through the GPU 118. The geometry shading engine 208 is a programmable execution unit, such as the streaming multiprocessor 124-1, that is configured to execute a machine code geometry shading program, processing graphics primitives received from the primitive assembler 206 as specified by the geometry shading program. The geometry shading engine 208 may be programmed to generate zero or more new graphics primitives and calculate parameters, such as plane equation coefficients, that are used to rasterize the new graphics primitives. For example, for use in cube-map rendering, the geometry shading engine 208 may be configured to process input primitives, sextuple the input primitives, and emit up to six sets of output primitives, one for each face of a cube. The geometry shading engine 208 may read and write data that is stored in the GPU local memory 120 and the on-chip GPU memory 122. The geometry shading engine 208 outputs the parameters and new graphics primitives to the rasterizer 210. The rasterizer 210 is a fixed-function unit that scans the new graphics primitives and outputs fragments and coverage data to the fragment shading engine 212.

The fragment shading engine 212 is a programmable execution unit, such as the streaming multiprocessor 124-1, that is configured to execute a machine code fragment shading program, processing fragments received from rasterizer 210 as specified by the machine code fragment shading program. For example, the fragment shading engine 212 may be programmed to perform operations such as perspective correction, texel mapping, shading, blending, and the like, to produce shaded fragments that are output to the raster operations unit 214. The fragment shading engine 212 may read and write data that is stored in the GPU local memory 120 and the on-chip GPU memory 122. The raster operations unit 214 optionally performs fixed-function computations such as near and far plane clipping and raster operations, such as stencil, z test and the like, and outputs pixel data as processed graphics data for storage in a buffer in the GPU local memory 120, such as the frame buffer 126.

Certain embodiments of the graphics pipeline 200 include a tesselation engine (not shown) configured to convert low-detail subdivision surfaces into higher-detail primitives. In general, tessellation tiles high-order surfaces into structures that are more suitable for rendering.

Figure 3:
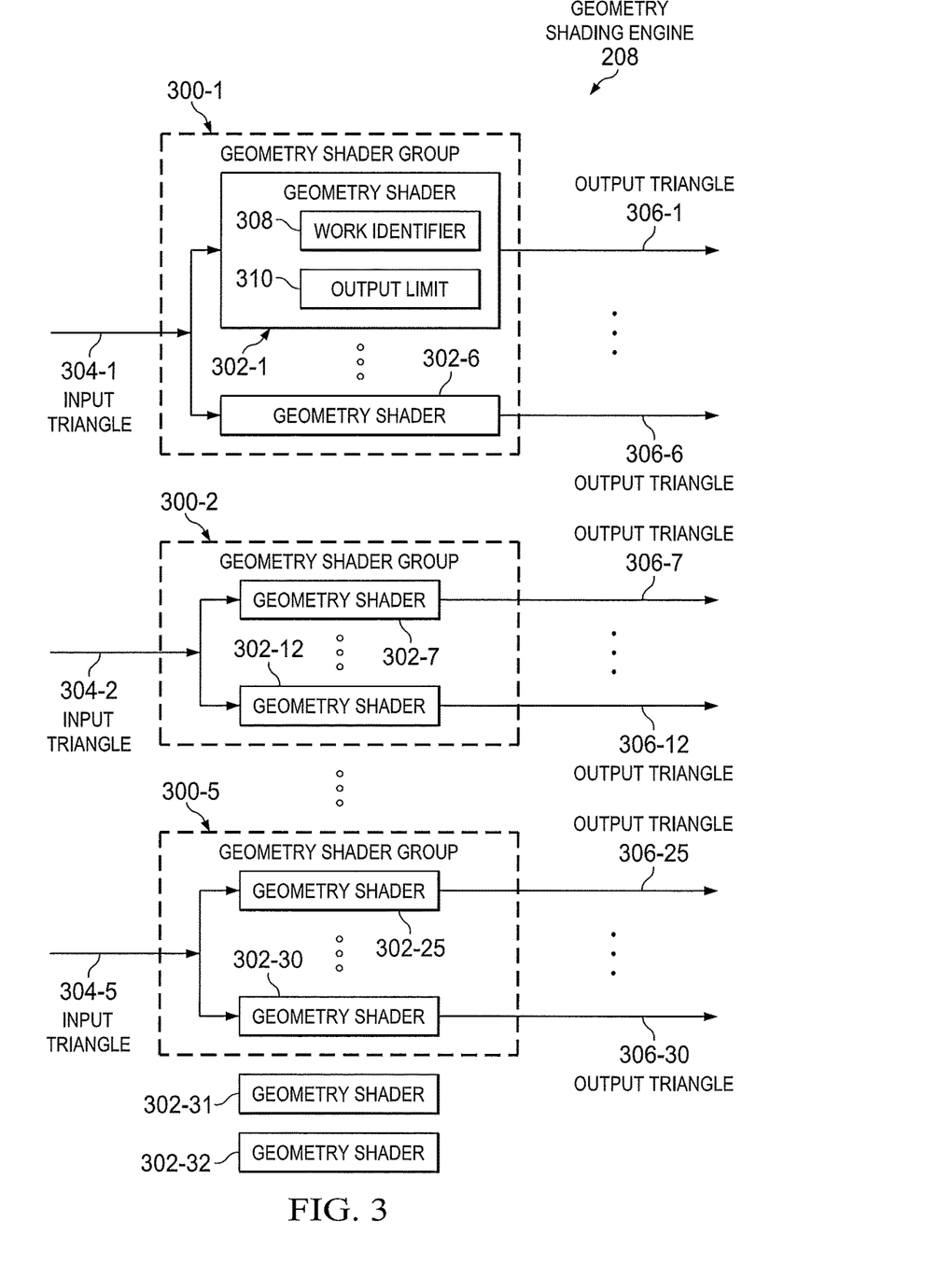
FIG. 3 is a block diagram of one embodiment of a geometry shading engine of the graphics pipeline of FIG. 2.

FIG. 3 is a block diagram of one embodiment of a geometry shading engine 208 of the graphics pipeline 200 of FIG. 2. As shown, the geometry shading engine 208 is a streaming multiprocessor 124 configured to perform geometry shading operations according to a geometry shading program. Each streaming processor in the streaming multiprocessor 124 is configured as an individual geometry shader 302, executing a single thread, which is an instance of the geometry shading program. In one embodiment, the streaming multiprocessor 124 includes 32 streaming processors, thereby providing the geometry shading engine 208 with 32 individual geometry shaders 302. In alternate embodiments, there may be more or fewer than 32 streaming processors and, thus, geometry shaders 302.

Having described a computing system within which the primitive texel data structure may be embodied or carried out, various embodiments of the primitive texel data structure and method will be described.

Figure 4:
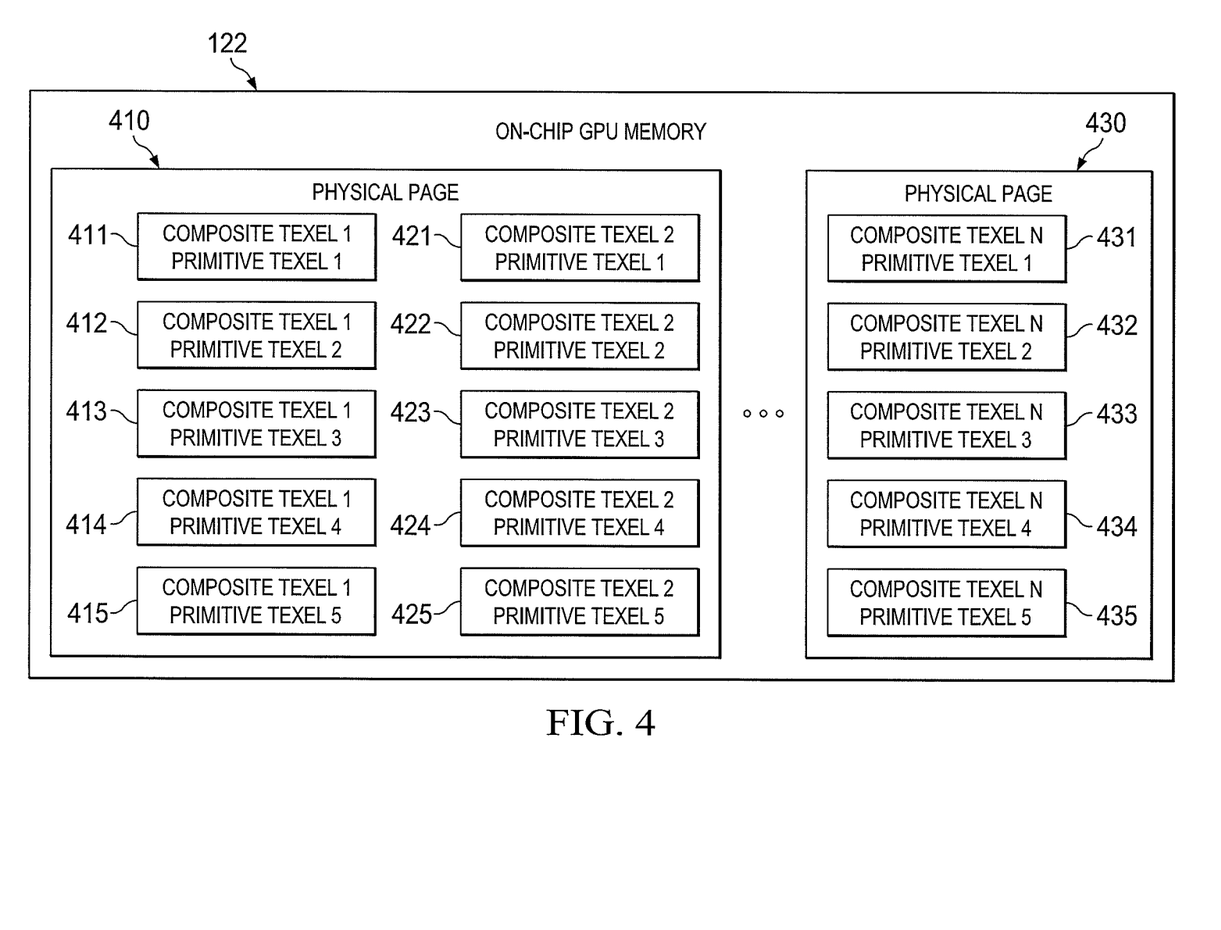
FIG. 4 is a block diagram of one embodiment of a portion of the on-chip GPU memory of FIG. 1.

FIG. 4 is a block diagram of one embodiment of a portion of the on-chip GPU memory 122 of FIG. 1. The GPU memory 122 is divided into pages. One page 410 contains multiple blocks of primitive texels corresponding to a particular composite texel. In various embodiments, the primitive texels include at least one primitive texel attribute, such as: normal, diffuse or specular color, shine, reflection, transparency, incandescence, translucency, refraction and bumpiness.

In the embodiment of FIG. 4, the page 410 contains multiple blocks of primitive texels corresponding to a particular composite texel 1 (i.e., blocks 411-415). Thus, multiple (two or more) primitive texels corresponding to composite texel 1 can be fetched with a single address translation or TLB hit. Also in the embodiment of FIG. 4, the page 410 contains all of the primitive texels corresponding to texel 1. Thus, a single address translation is all that is required to cause the blocks 411-415 corresponding to the composite texel 1 to be fetched.

The page 410 also contains multiple primitive texels corresponding to another particular composite texel, composite texel 2 (i.e., blocks 421-425). Certain embodiments of the page 410 contain multiple primitive texels (not shown) corresponding to other composite texels. While the blocks 421-425 are fetched along with the primitive texels corresponding to texel 1, it is typically expected that the extent to which the page 410 is wasted is reduced with the benefit of the primitive texel data structure described herein. Further, when it comes time to perform shading with respect to texel 2, an entry corresponding to the page 410 may still reside in the TLB. Thus, the address translation that would otherwise be required to fetch the blocks 421-425 can be avoided.

In the embodiment of FIG. 4, the blocks 411-415 and the blocks 421-425 are each contained in uniform (e.g., 4 kB) blocks. They are interleaved with each other such that the block 421 is stored between the block 411 and the block 422, etc. Further, in the embodiment of FIG. 4, the address of the 411 is also the address of the page 410. Accordingly, MSBs of adequate length are pre-appended to a base address (e.g., of 12-bits in the case of a 4-kB block size). For example, if each composite texel has eight corresponding primitive texels, three MSBs are adequate to address the blocks containing the eight corresponding primitive texels. Addressing the primitive texel blocks in this manner is not required, but requires less address translation.

FIG. 4 also shows a page 420 containing blocks 431-435 corresponding to a composite texel N. In the embodiment of FIG. 4, the blocks 431-435 are contained in 4 kB blocks. The blocks 431-435 are interleaved such that the block 432 is stored between the block 431 and the 433, etc. Further, in the embodiment of FIG. 4, the address of the block 431 is offset by a multiple of a power of two from the address of the page 420. Accordingly, MSBs of adequate length are pre-appended to a 12-bit base address.

In the above-described embodiments, each of the primitive texels corresponds to a single composite texel. How-ever, this need not be the case. In an alternative embodiment, a particular primitive texel corresponds to, and is employed to create, multiple composite texels. For example, one or more of the primitive texels contained in the blocks 431-435 correspond to, for example, four composite texels. This embodiment therefore employs fewer primitive texels to construct the same number of composite texels, requiring less memory to store the primitive texels and decreasing the number of address translations or TLB lookups necessary to perform shading operations with respect to a given number of composite texels.

Also in the above-described embodiments, the primitive texels are assumed to be of the same size. However, this need not be the case either. In an alternative embodiment, the primitive texels are of different size. For example, some primitive texels may cover a 4×8 tile, while others may cover a 2×4 tile. Likewise, the composite texels may be of different size. Further, the sizes of the primitive texels need not equal the sizes of their corresponding composite texels.

Because primitive texels are referenced with a strong spatial locality, those skilled in the pertinent art will understand that adjacent primitive texels are likely to be used concurrently across multiple threads in embodiments in which the GPU supports multi-threaded execution. It is therefore advantageous that primitive texels be stored adjacently. However, while a composite texel is created using multiple primitive texels within a given page, the primitive texels are advantageously interleaved coarsely, and not finely, within the page. This may be referred to as an "array of structures of arrays." The "array of structures" is the composite texel, the structure is the memory page and "structure of arrays" are the individual primitive texels.

Figure 5:
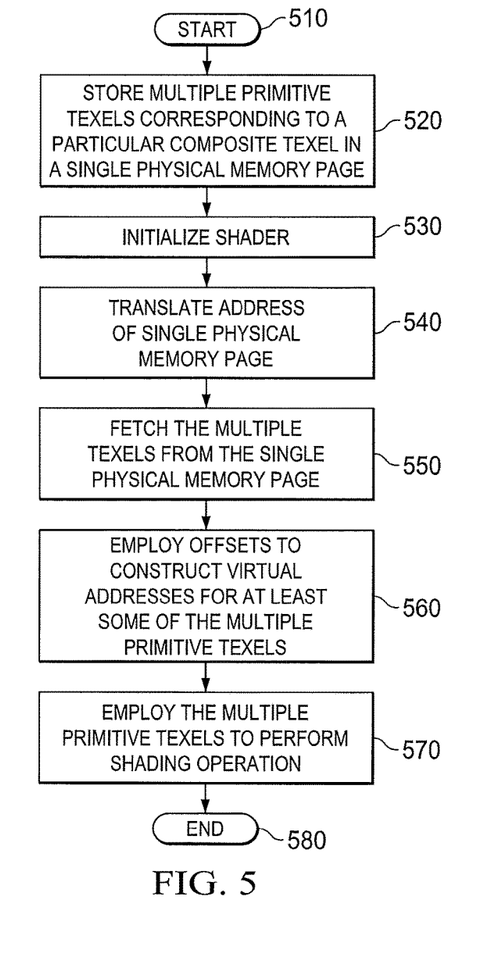
FIG. 5 is a flow diagram of one embodiment of a method of shading.

FIG. 5 is a flow diagram of one embodiment of a method of shading. The method begins in a step 510. In a step 520, multiple primitive texels corresponding to a particular composite texel are stored in a single page. In a step 530, at least one shader is initialized to perform at least one shading operation with respect to a particular composite texel. At some point, the shader needs to gain access to at least some primitive texels corresponding to the particular composite texel. Accordingly, in a step 540, the shader initiates a fetch of the primitive texels, resulting in an address translation corresponding to the single page. In an alternative embodiment, an entry is retrieved from a TLB in lieu of the address translation. In a step 550, multiple primitive texels are fetched from the single page. In one embodiment, the page contains all of the primitive texels the shader requires, freeing the shader from having to initiate any fetches of further pages. In a step 560, at least one offset is employed to address at least one of the multiple primitive texels contained in the page. The shader then employs the multiple primitive texels to perform the shading operation in a step 570. The method ends in an end step 580.

Those skilled in the art to which this application relates will appreciate that other and further additions, deletions, substitutions and modifications may be made to the described embodiments.

What is claimed is:

1. A graphics processing subsystem, comprising:
a Graphics Processing Unit memory configured to contain a texel data structure according to which multiple primitive texels corresponding to a particular composite texel are interleaved in a single page of said memory, wherein each of said multiple primitive texels represents a different shading attribute of said particular composite texel; and a graphics processing unit configured to communicate with said memory via a data bus and execute a shader to fetch said multiple primitive texels contained in said single page to create said particular composite texel.

2. The subsystem as recited in claim 1 wherein said single page contains all primitive texels said shader requires to create said particular composite texel.

3. The subsystem as recited in claim 1 wherein said graphics processing unit is configured to employ offsets to construct virtual addresses for at least some of said multiple primitive texels.

4. The subsystem as recited in claim 1 wherein said multiple primitive texels are contained in uniform blocks within said single page.

5. The subsystem as recited in claim 1 wherein said single page contains multiple primitive texels corresponding to multiple composite texels.

6. The subsystem as recited in claim 1 wherein said shading attributes are associated with lighting and shading properties of said particular composite texel.

7. The subsystem as recited in claim 1 wherein said graphics processing unit is configured to execute a plurality of shaders.

8. A method of shading, comprising:
initializing a shader to perform a shading operation with respect to a particular composite texel;
initiating a fetch of multiple primitive texels corresponding to said particular composite texel, said initiating resulting in an address translation corresponding to a single page, in which said multiple primitive texels corresponding to said multiple texel attributes are interleaved;
fetching said multiple primitive texels from said single page; and
employing said multiple primitive texels and a processor to perform said shading operation, wherein each of said multiple primitive texels represents a different shading attribute of said particular composite texel.

9. The method as recited in claim 8 wherein said page contains all primitive texels said shader requires to perform said shading operation.

10. The method as recited in claim 8 further comprising employing offsets to construct virtual addresses for at least some of said multiple primitive texels.

11. The method as recited in claim 8 wherein said multiple primitive texels are contained in uniform blocks.

12. The method as recited in claim 8 wherein said page contains multiple primitive texels corresponding to multiple composite texels.

13. The method as recited in claim 8 wherein said shading attributes are selected from the group of attributes consisting of normal, diffuse or specular color, shine, reflection, transparency, incandescence, translucency, refraction, and bumpiness.

14. The method as recited in claim 8 wherein a graphics processing unit executes at least one shader.

15. A graphics processing subsystem, comprising:
a Graphics Processing Unit memory configured to contain a texel data structure according to which a first primitive texel corresponding to one shading attribute of a particular composite texel is interleaved with second primitive texel corresponding to another shading attribute of said particular composite texel in a single page of said memory; and
a graphics processing unit configured to communicate with said memory via a data bus and including a plurality of streaming multiprocessors, at least one of said streaming multiprocessors configured to execute a shader, said shader configured to:
initiate a fetch of said first and second primitive texels, said initiating involving a single address translation of said single page, and
employ said first and second primitive texels to create said particular composite texel.

16. The subsystem as recited in claim 15 wherein said page contains all primitive texels said shader requires to perform a shading operation.

17. The subsystem as recited in claim 15 said graphics processing unit employs at least one offset to address at least one of said primitive texels.

18. The subsystem as recited in claim 15 wherein said primitive texels are contained in uniform blocks.

19. The subsystem as recited in claim 15 wherein said page contains said primitive texels corresponding to multiple composite texels.

20. The subsystem as recited in claim 15 wherein said shading attributes are lighting related texel attributes.

* * * * *